(12) United States Patent
Knott et al.

(10) Patent No.: US 11,912,403 B2
(45) Date of Patent: Feb. 27, 2024

(54) PITCH LINK CENTERING TOOL (71) Applicant: Bell Textron Inc., Fort Worth, TX (US)

(72) Inventors: Kevin Knott, Arlington, TX (US);
Vitthal Vishnuthreeth Arakeri, Bangalore (IN)

(73) Assignee: Textron Innovations Inc., Providence, RI (US)

( * ) Notice: Subject to any disclaimer, the term of this patent is extended or adjusted under 35 U.S.C. 154(b) by 103 days.

(21) Appl. No.: 17/306,610

(22) Filed: May 3, 2021

(65) Prior Publication Data
US 2022/0297831 A1 Sep. 22, 2022

(30) Foreign Application Priority Data
Mar. 20, 2021 (IN) .............................. 202121011946

(51) Int. Cl.
*B64C 27/605* (2006.01)
*F01D 7/00* (2006.01)

(52) U.S. Cl.
CPC .............. *B64C 27/605* (2013.01); *F01D 7/00* (2013.01); *F05D 2220/90* (2013.01)

(58) Field of Classification Search
CPC ................................ B64C 27/605; F01D 7/00
See application file for complete search history.

(56) References Cited

U.S. PATENT DOCUMENTS

| | | | | |
|---|---|---|---|---|
| 2,860,711 A | * | 11/1958 | Dancik | .................. B64C 27/59 416/116 |
| 10,239,609 B2 | * | 3/2019 | Davis | ..................... B64C 11/301 |
| 2007/0166162 A1 | | 7/2007 | Podgurski | |
| 2013/0168492 A1 | | 7/2013 | Biser et al. | |
| 2018/0327089 A1 | * | 11/2018 | Shimek | .................... B32B 27/38 |
| 2019/0009898 A1 | | 1/2019 | Bosworth et al. | |
| 2019/0023387 A1 | | 1/2019 | Davis et al. | |

* cited by examiner

*Primary Examiner* — Michael L Sehn
(74) *Attorney, Agent, or Firm* — Bradley Arant Boult Cummings LLP (57) ABSTRACT

An exemplary pitch link centering tool includes a rod having a longitudinal axis, a front face, a rear face, a first rod end and a second rod end, the first rod end having a first aperture with a first rotational axis, the second rod end having a second aperture with a second rotational axis, a first connector coupled to the first rod end, the first connector having a first slot extending in a first radial direction relative to the longitudinal axis and a second connector coupled to the second rod end, the second connector having a second slot extending in a second radial direction relative to the longitudinal axis different from the first radial direction.

17 Claims, 7 Drawing Sheets

PITCH LINK CENTERING TOOL

CROSS-REFERENCE TO RELATED APPLICATIONS

This application claims priority from Indian Application No. 202121011946, filed Mar. 20, 2021, the entire contents of which are incorporated by reference in their entirety herein for all purposes.

TECHNICAL FIELD

This disclosure relates in general to the field of aircraft, and more particularly, but not by way of limitation, to rotor systems and to adjusting the length of a pitch link while it is installed in an aircraft rotor system.

BACKGROUND

This section provides background information to facilitate a better understanding of the various aspects of the disclosure. It should be understood that the statements in this section of this document are to be read in this light, and not as admissions of prior art.

Aircraft may include one or more rotor systems. For example, an aircraft may have a main rotor system to generate aerodynamic lift to support the aircraft in flight and thrust to counteract aerodynamic drag and move the aircraft in forward flight. An aircraft may have an anti-torque rotor to counter the torque effect created by a main rotor system. A rotor system may include one or more pitch links to rotate, deflect, and/or adjust rotor blade pitch.

Adjustable length pitch links are commonly used to connect rotor blades in aircraft rotor systems. Commonly, adjustable length pitch links are simple devices having opposing rod ends that are threadedly connected to each other by a threaded tube. The length of the link is adjusted by threading one or both of the rod ends with the tube. Pitch link length adjustments allow fine tuning the blade track thereby reducing vibrations. The angle between the rod ends of the pitch link must be retained while making the length adjustment. Typically, the length of the pitch link is adjusted with the pitch link removed from the aircraft. Adjusting the length with the pitch link on the aircraft and maintaining the correct angle between the rod ends is difficult to achieve and subsequent measurements and adjustments are generally required to achieve the correct angle.

SUMMARY

An exemplary pitch link centering tool includes a rod having a longitudinal axis, a front face, a rear face, a first rod end and a second rod end, the first rod end having a first aperture with a first rotational axis, the second rod end having a second aperture with a second rotational axis, a first connector coupled to the first rod end, the first connector having a first slot extending in a first radial direction relative to the longitudinal axis and a second connector coupled to the second rod end, the second connector having a second slot extending in a second radial direction relative to the longitudinal axis different from the first radial direction.

An exemplary rotorcraft rotor system includes a hub coupled to a driveshaft, a blade coupled to the hub, a swashplate positioned about the driveshaft, an adjustable length pitch link having a central link, a top rod end attached to the blade and a bottom rod end attached to the swashplate with a radial angle between the top rod end and the bottom rod end, and a centering tool having a first connector coupled to one the bottom rod end and the top rod end and a second connector coupled to the other of the bottom rod end and the top rod end, the centering tool holding the top rod end and the bottom rod end at the radial angle.

An exemplary method for adjusting a length of a pitch link that is installed in a rotorcraft rotor system includes using a centering tool including a rod having a longitudinal axis, a first connector coupled to a first rod along a first rotational axis and having a first slot extending in a first radial direction relative to the longitudinal axis, and a second connector coupled to a second rod end along a second rotational axis and having a second slot extending in a second radial direction relative to the longitudinal axis that is different from the first radial direction. Attaching the centering tool to the pitch link, the pitch link comprising a central link, a top rod end attached to a rotor blade and a bottom rod end attached to a swashplate with the pitch link at a first length and a radial angle between the top rod end and the bottom rod end. Positioning one of the top rod end and the bottom rod end in the first slot and then rotating the rod about the first rotational axis and positioning the other of the top rod end and the bottom rod end in the second slot thereby holding the top rod end and the bottom rod end at the radial angle. Changing the first length to a second length while holding the top rod end and the bottom rod end at the radial angle with the centering tool.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

Figure 1:
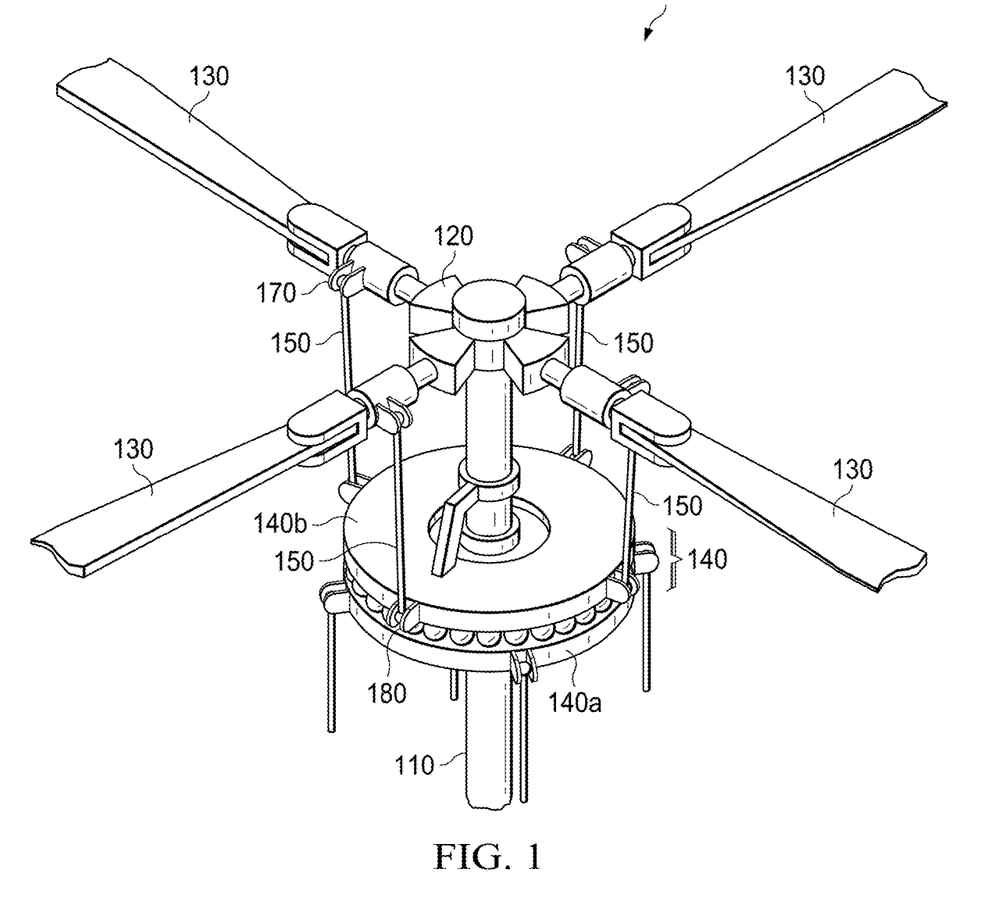
FIG. 1 illustrates an exemplary rotorcraft rotor system according to aspects of the disclosure.

FIG. 1 illustrates an exemplary aircraft rotor system generally denoted by the numeral 100. Teachings of certain embodiments relating to rotor systems may apply to rotor lift, forward flight, and anti-torque rotor systems, such as tiltrotor, tilt-wing, ducted rotor, distributed rotor systems, and helicopter rotor systems. It should be appreciated that teachings herein apply to manned and unmanned aerial vehicles.

In this example, rotor assembly 100 includes a drive shaft 110, a drive assembly or hub 120, blades 130, a swashplate 140, and adjustable length pitch links used as pitch links 150. Drive shaft 110 and drive assembly 120 are mechanical components for transmitting torque and/or rotation. Drive shaft 110 and drive assembly 120 may represent components of a drive train, which may also include an engine, a transmission, differentials, and the final drive (e.g., blades 130). In operation, drive shaft 110 receives torque or rotational energy and rotates drive assembly 120. Rotation of drive assembly 120 causes blades 130 to rotate about drive shaft 110.

Swashplate 140 translates input via flight controls into motion of blades 130. Because blades 130 are typically spinning when the aircraft is in flight, swashplate 140 may transmit flight controls from the non-rotating fuselage to the rotating drive assembly 120 and/or blades 130.

In some examples, swashplate 140 may include a stationary swashplate 140a and a rotating swashplate 140b. Stationary swashplate 140a does not rotate with drive shaft 110, whereas rotating swashplate 140b does rotate with drive shaft 110. Pitch links 150 connect rotating swashplate 140b to blades 130. For example, the top rod end of the pitch link is connected to blade 130 at a pitch horn 170 and the bottom rod end is connected to the swashplate at a clevis 180. In operation, tilting stationary swashplate 140a causes rotating swashplate 140b to tilt, which in turn moves pitch links 150 up and down. Moving pitch links 150 up and down changes the pitch of blades 130.

Figure 2:
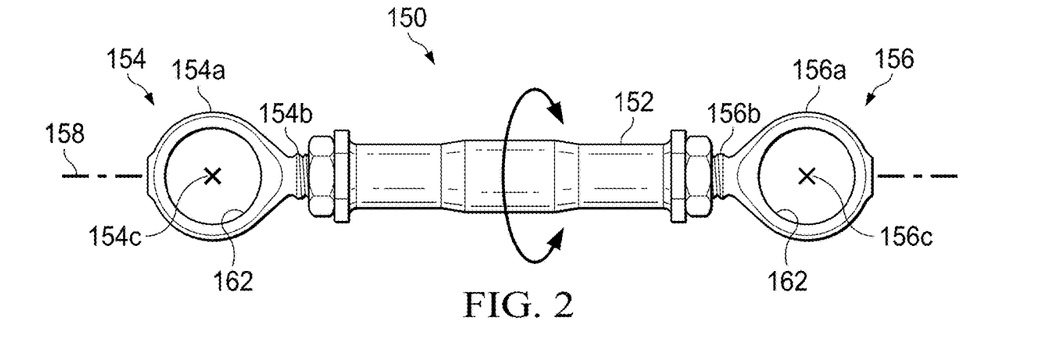
FIG. 2 illustrates an exemplary adjustable length pitch link.
Figures 3, 4:
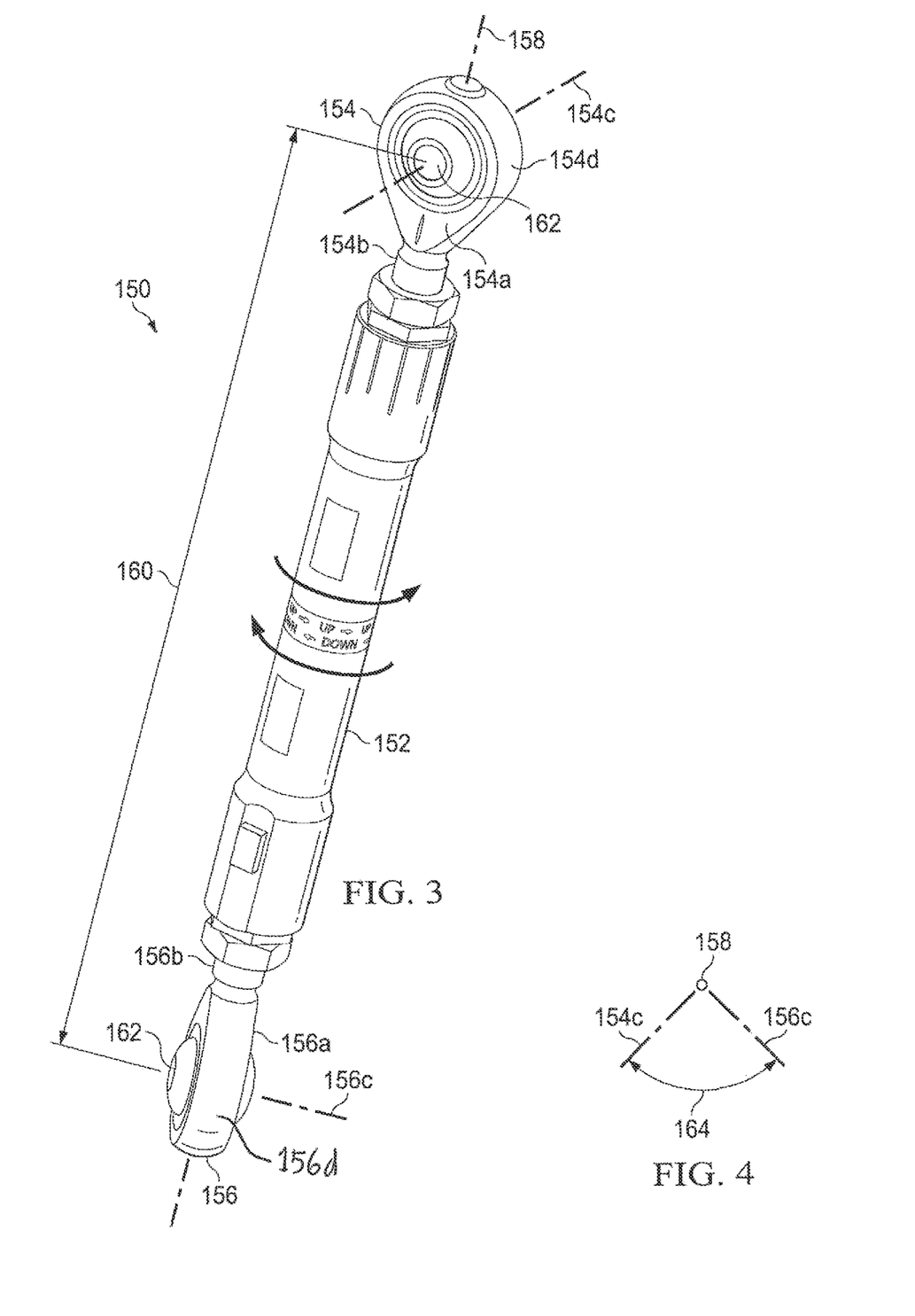
FIG. 3 illustrates another view of an exemplary adjustable length pitch link.
FIG. 4 illustrates an angle between top and bottom rod ends of an adjustable length pitch link.

FIGS. 2 and 3 illustrate exemplary adjustable length pitch links 150. Pitch link 150 includes a central link 152, a first rod end 154, and a second rod end 156. Pitch link 150 extends along an axis 158 through first and second rod ends 154, 156. Central link 152 threadedly interconnects first and second rod ends 154, 156 allowing the length 160 to be changed.

Rod ends 154, 156 each have a rod head 154a, 156a and a rod neck 154b, 156b. Rod head 154a has a hole 162 with a central axis 154c and a lateral side 154d parallel to central axis 154c. Similarly, rod head 156a has a hole 162 with a central axis 156c and a lateral side 156d parallel to central axis 156c.

First and second rod ends 154, 156 are illustrated in FIG. 2 oriented parallel to each other for the purpose of illustrating the pitch link. When pitch link 150 is installed in the rotor system, rod ends 154, 156 will be oriented at a non-parallel angle to one another as illustrated in FIGS. 3 and 4. The angle between the top and bottom rod ends is determined by the orientation of the pitch horn attachment and the swashplate clevis. FIG. 4 shows central axes 154c, 156c oriented at an exemplary angle 164 to one another relative to pitch link axis 158. Angle 164 is illustrative of a correct angle between the rod end 154 and rod end 156 when installed in a rotor system.

As understood by those skilled in the art, the length 160 of pitch link 150 may be changed by twisting components of pitch link 150 relative to one another. In practice the length is set prior to being connected in a rotor system. If the length needs to be adjusted the pitch link is typically removed from the rotor system, length adjusted and reinstalled. Length adjustments while the pitch link is installed is hindered by space constraints and the requirement that the correct angle be maintained between the rod ends.

Figure 5:
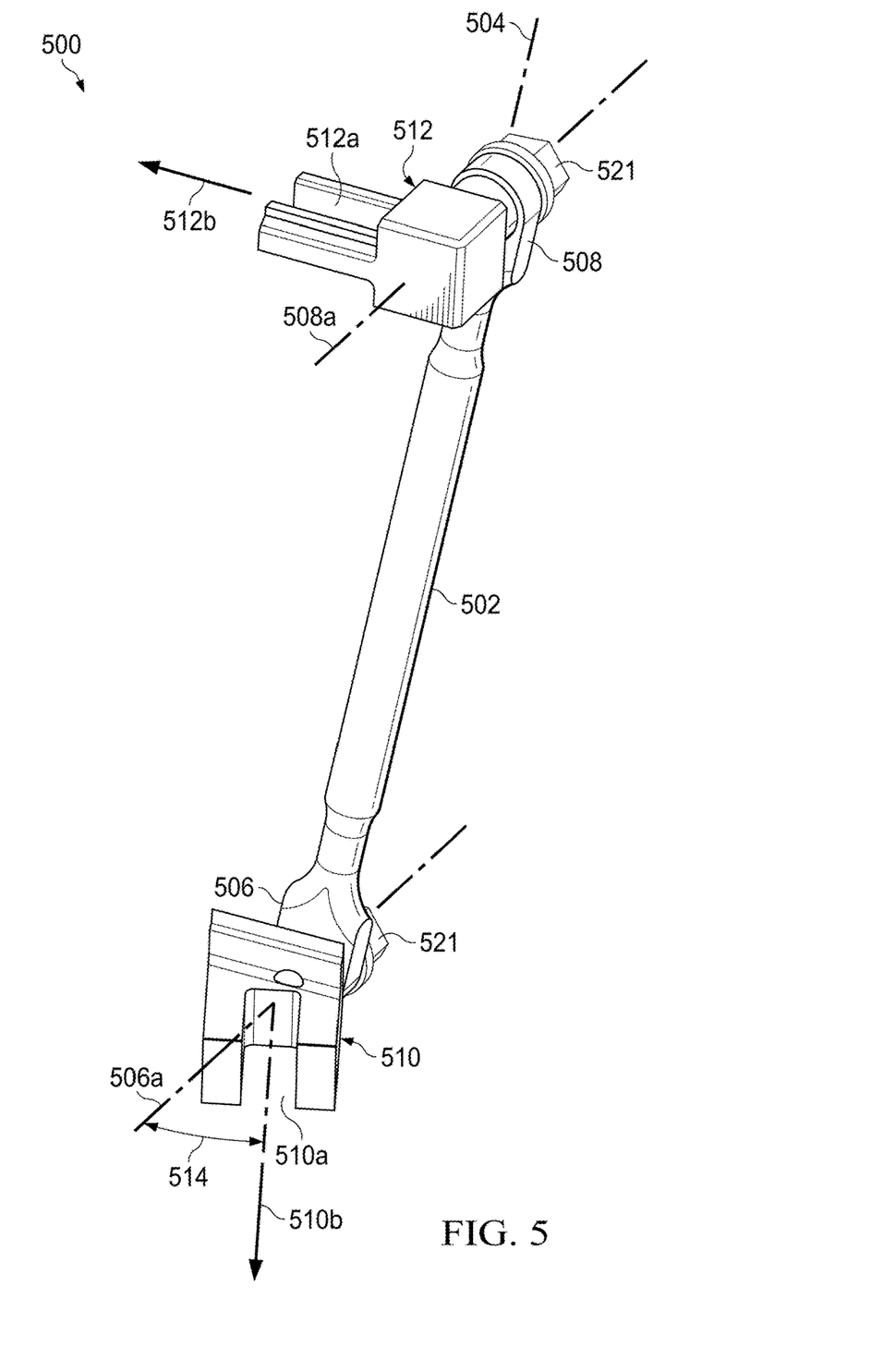
FIG. 5 illustrates an exemplary pitch link centering tool according to aspects of the disclosure.

FIG. 5 illustrates an exemplary centering tool 500 configured to attach to a pitch link that is installed in a rotor system and to hold the pitch link rod ends at the correct angle while the length of the pitch link is adjusted. With reference in particular to FIGS. 5-9, pitch link centering tool 500 includes a rod 502 extending along a longitudinal axis 504. Rod 502 includes a first rod end 506 and a second rod end 508. In an exemplary embodiment, first and second rod ends 506, 508 are in a fixed orientation relative to rod 502 and cannot be rotated relative to rod 502. First rod end 506 has a first connector 510 with a first receiver slot 510a extending in a first radial direction 510b relative to axis 504. Second rod end 508 has a second connector 512 with a second receiver slot 512a extending in a second radial direction 512b relative to axis 504 that is different from first radial direction 510b. The angle between the first and second radial directions 510b, 512b relative to axis 504 is the same as the angle 164 for the installed pitch link.

First connector 510 and/or second connector 512 may be rotatably connected to respective rod ends 506 and 508. For example, first rod end 506 has a first rotational axis 506a extending normal to longitudinal axis 504 and second rod end 508 has a second rotational axis 508a extending parallel to first rotational axis 506a. First connector 510 rotates about first rotational axis 506a and second connector 512 rotates about second rotational axis 508a. In an embodiment, first radial direction 510b intersects first rotational axis 506a at a non-perpendicular angle 514 and second radial direction 512b intersects second rotational axis 508a at a right angle.

Figure 6:
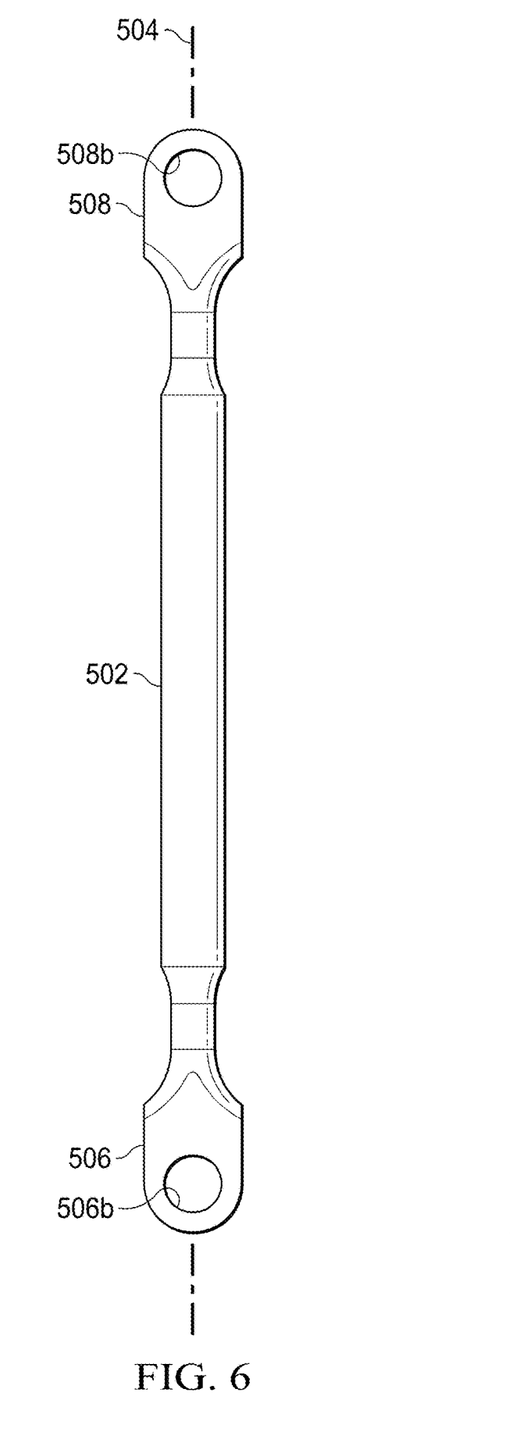
FIG. 6 is a front view of an exemplary rod of an exemplary pitch link centering tool according to aspects of the disclosure.
Figure 7:
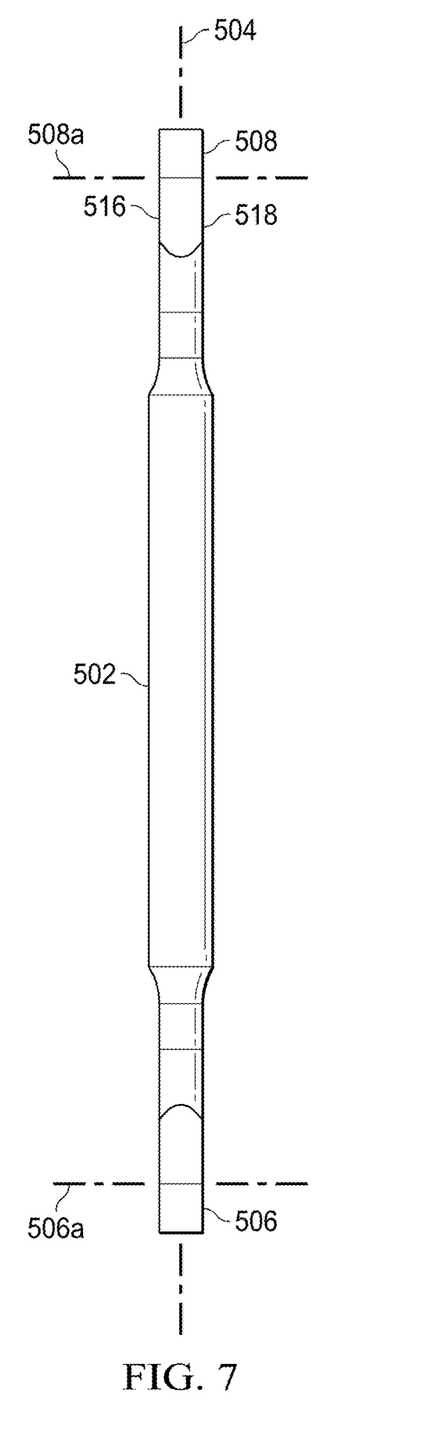
FIG. 7 is a side view of an exemplary rod of an exemplary pitch link centering tool according to aspects of the disclosure.

Referring in particular to FIGS. 6-7, rod 502 has a front face 516 and an opposite rear face 518. First rod end 506 has an aperture 506b with a first rotational axis 506a. Second rod end 508 has an aperture with a second rotational axis 508a.

In the exemplary example, rod ends 506, 508 are fixed relative to rod 502 and first rotational axis 506a and second rotational axis 508a are parallel.

Figure 8:
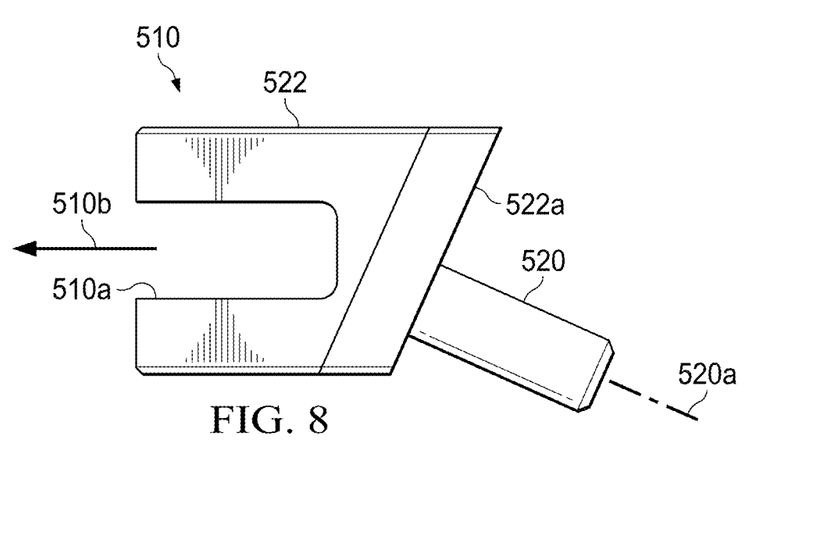
FIG. 8 illustrates a first connector of exemplary pitch link centering tool according to aspects of the disclosure.

FIG. 8 illustrates an exemplary first connector 510 in isolation. With continued reference to FIGS. 1-9, first connector 510 includes a shaft 520 and a block 522. Shaft 520 is configured to be disposed in first aperture 506b. A connector 521 (FIG. 5) may secure first connector 510 to first rod end 506. Shaft 520 extends along an axis 520a that is co-axial with first rotational axis 506a, when connected to rod 502. Block 522 has first receiver slot 510a extending in the first direction 510b. Block 522 has a back surface 522a where shaft 520 connects to block 522. Back surface 522a is normal to axis 520a and shaft 520 permitting rod 502 to rotate relative to first connector 510 about axis first rotational axis 506a while maintaining a set angle between first receiver slot 510a and second receiver slot 512a.

Figure 9:
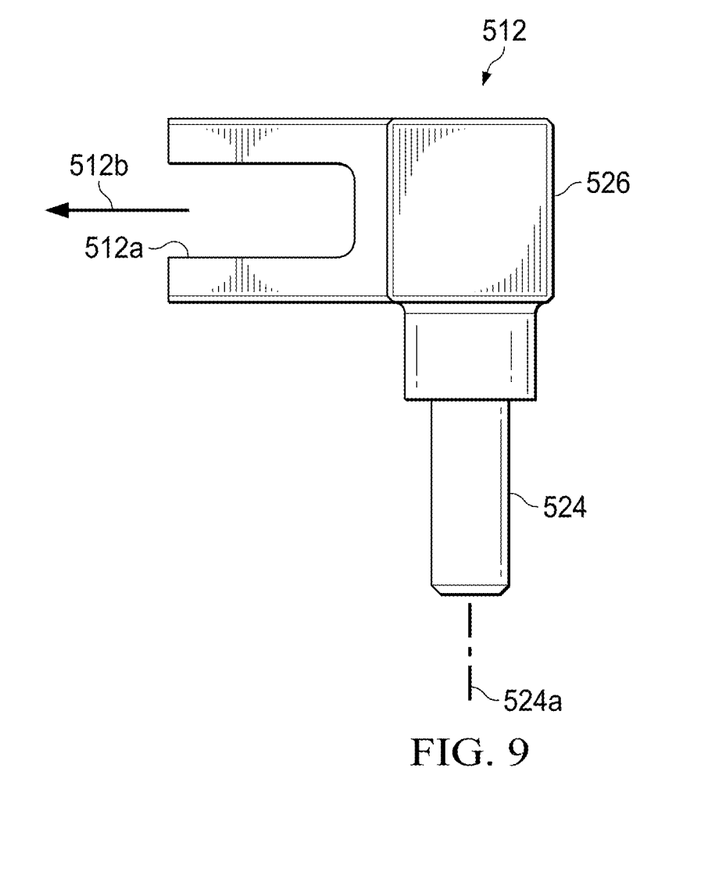
FIG. 9 illustrates a second connector of exemplary pitch link centering tool according to aspects of the disclosure.

FIG. 9 illustrates an exemplary second connector 512 in isolation. With continued reference to FIG. 1-9, second connector 512 includes a shaft 524 and a block 526. Shaft 524 is configured to be disposed in second aperture 508b. A connector 521 (FIG. 5) may secure second connector 512 to second rod end 508. Shaft 524 extends along an axis 524a that is co-axial with second rotational axis 508a, when connected to rod 502. Block 526 has second receiver slot 512a extending in second direction 512b.

Figure 10:
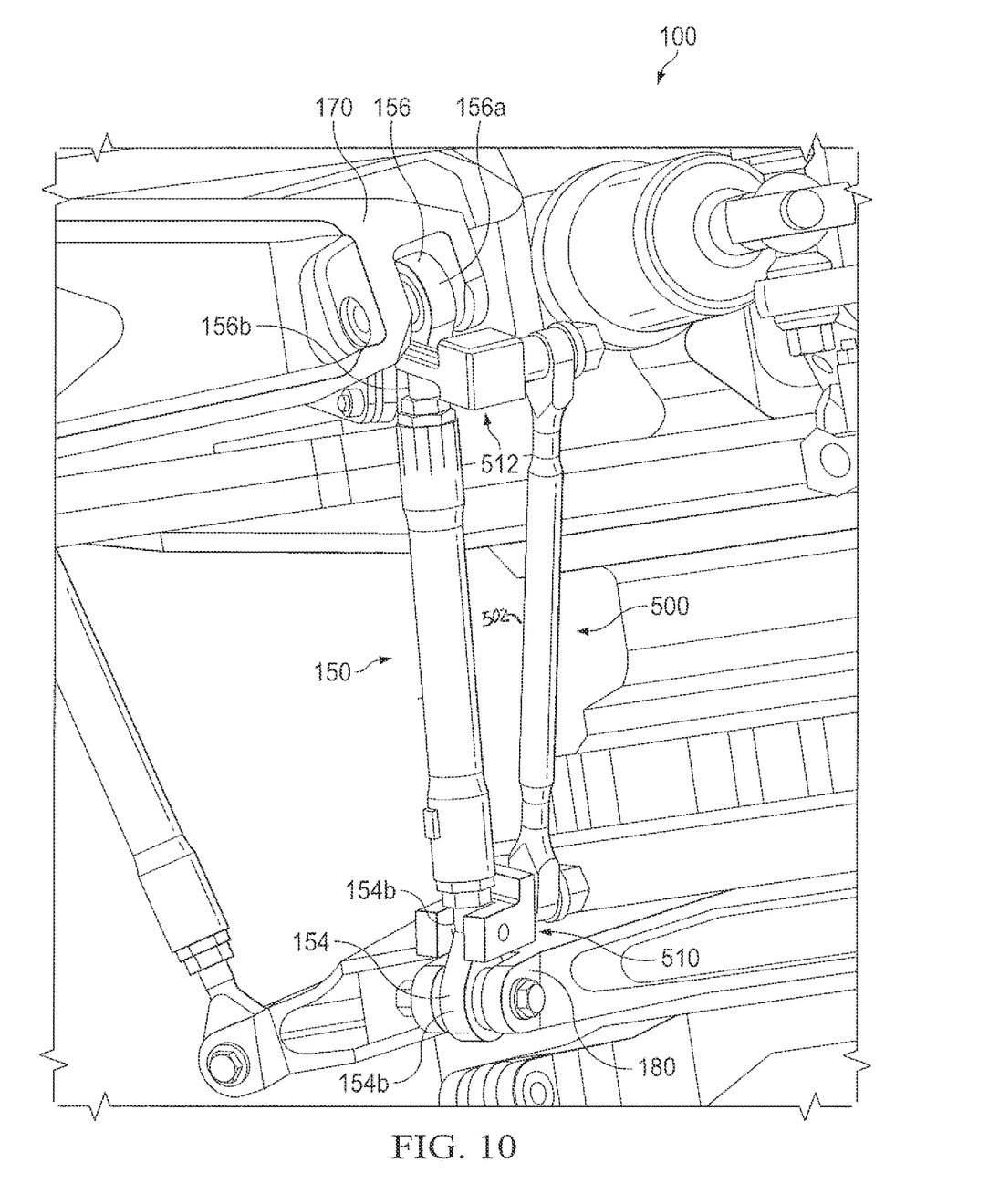
FIG. 10 illustrates an exemplary pitch link centering tool secured to an adjustable length pitch link that is installed in a rotor system.

FIG. 10 illustrates a pitch link centering tool 500 connected to a pitch link 150 that is installed in an exemplary rotor system 100. With reference to FIGS. 1-10, pitch link 150 has a bottom rod end 154 attached to swashplate clevis 180 and top rod end 156 attached to a pitch horn 170. First and second rod ends 154, 156 are oriented at a non-parallel angle relative to each other. Rod head 154a is located inside swashplate clevis 180 preventing access to rod head 154a with a tool. Similarly, rod head 156a is located inside the pitch horn attachment 170 limiting access to rod head 156a with a tool.

In this exemplary embodiment, first connector 510 is coupled to bottom pitch link rod end 154 and second connector 512 is coupled to top pitch link rod end 156. In other embodiments, first connector 510 can be coupled to top rod end 154 and second connector 512 can be coupled to bottom rod end 156. First connector 510 is coupled to rod end 154 by disposing rod neck 154b in receiver slot 510a. Rod neck 154b is secured, e.g. friction fit, in receiver slot 510a so that rod end 154 does not rotate relative to first connector 510. Similarly, second connector 512 is coupled to rod end 156 with rod neck 156b located in receiver slot 512a. Rod neck 156b is secured in receiver slot 512a so that rod end 156 does not rotate relative to second connector 512. Centering tool 500 maintains first receiver slot 510a and second receiver slot 512a at a fixed radial angle relative to one another thereby maintaining pitch link rod ends 154, 156 at the correct angle 164 (FIG. 4) relative to one another while the length of pitch link 150 is changed. The length of pitch link 150 is adjusted by rotating a rod end 154, and/or 156 relative to central link 152.

Figure 11:
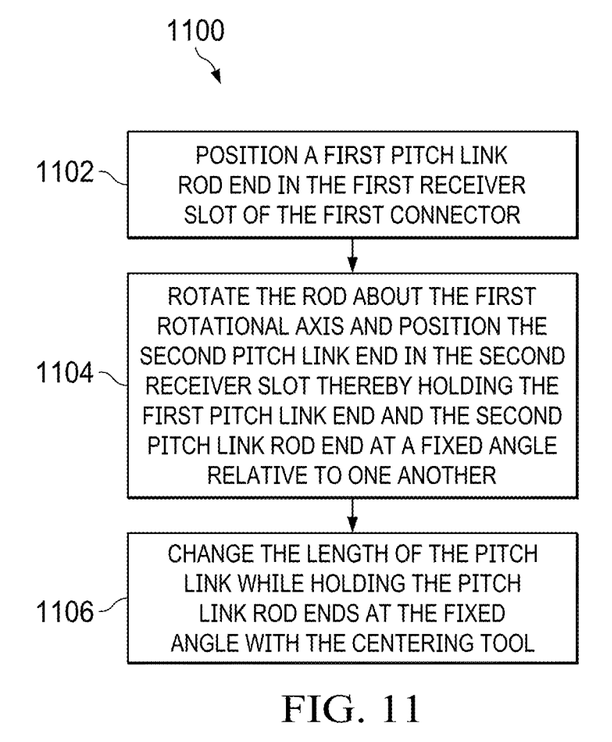
FIG. 11 is a flow chart of an exemplary method for adjusting the length of a pitch link that is installed in a rotor system.

FIG. 11 is a flow diagram of an exemplary method 1100 for adjusting a length of a pitch link 150 that is installed on a rotorcraft rotor system 100 using a centering tool 500. Exemplary method 1100 is described with reference to FIGS. 1-11. At block 1102, a first pitch link rod end 154, e.g. rod neck 154b, is positioned in first receiver slot 510a thereby attaching first connector 510 to pitch link rod end 154. In this example, first connector 510 is coupled to the bottom pitch link rod end. First receiver slot 510a extends at a non-perpendicular angle 514 to first rotational axis 506a.

At block 1104, rod 502 is rotated about first rotational axis 506a until second pitch link rod end 156 is positioned in second receiver slot 512a of second connector 512 thereby holding the first and second rod ends 154, 156 at a fixed radial angle 164. First and second connectors 510, 512 cannot rotate about centering tool longitudinal axis 504 thereby preventing angular movement of rod ends 154, 156 relative to one another and holding rod ends 154, 156 at a fixed radial angle 164. At block 1106, length 160 of pitch link 150 is changed while centering tool 500 holds rod ends 154, 156 at fixed radial angle 164. Second connector 512 can rotate or pivot relative second rotational axis 508a as the length of pitch link 150 changes.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein.

Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A pitch link centering tool, the centering tool comprising:
   a fixed-length rod having a longitudinal axis, a front face, a rear face, a first rod end and a second rod end;
   the first rod end having a first aperture with a first rotational axis;
   the second rod end having a second aperture with a second rotational axis;
   a first connector coupled to the first rod end, the first connector having a first slot extending in a first radial direction relative to the longitudinal axis; and
   a second connector coupled to the second rod end, the second connector having a second slot extending in a second radial direction relative to the longitudinal axis that is different from the first radial direction;
   wherein the first rotational axis and the second rotational axis are parallel.

2. The centering tool of claim 1, wherein the first connector and the second connector are positioned on the front face.

3. The centering tool of claim 1, wherein the first connector and the rod are rotatable about the first rotational axis relative to one another.

4. The centering tool of claim 1, wherein the first slot and the first rotational axis intersect at an acute angle; and
   the second slot and the second rotational axis intersect at a right angle.

5. The centering tool of claim 1, wherein the first rotational axis and the second rotational axis are parallel;
   the first slot and the first rotational axis intersect at an acute angle; and
   the second slot and the second rotational axis intersect at a right angle.

6. The centering tool of claim 5, wherein the first connector and the rod are rotatable about the first rotational axis relative to one another.

7. The centering tool of claim 6, wherein the first connector and the second connector are positioned on the front face.

8. The centering tool of claim 5, wherein the first connector and the rod are rotatable about the first rotational axis relative to one another; and
   the second connector and the rod are rotatable about the second rotational axis relative to one another.

9. A rotorcraft rotor system, the rotor system comprising:
   a hub coupled to a driveshaft;
   a blade coupled to the hub;
   a swashplate positioned about the driveshaft;
   an adjustable length pitch link having central link, a top rod end attached to the blade and a bottom rod end attached to the swashplate with a radial angle between the top rod end and the bottom rod end; and
   a centering tool having a fixed-length rod, a first connector coupled to one of the bottom rod end and the top rod end and a second connector coupled to the other of the bottom rod end and the top rod end, the centering tool holding the top rod end and the bottom rod end at the radial angle.

10. The rotor system of claim 9, wherein the centering tool comprises:
    a rod having a longitudinal axis, a front face, a rear face, a first rod end and a second rod end;
    the first rod end having a first aperture with a first rotational axis;
    the second rod end having a second aperture with a second rotational axis parallel to the first rotational axis;
    the first connector coupled to the first rod end and having a first slot holding the bottom rod end; and
    the second connector coupled to the second rod end, the second connector having a second slot holding the top rod end.

11. The rotor system of claim 10, wherein the first connector and the rod are rotatable about the first rotational axis relative to one another; and
    the second connector and the rod are rotatable about the second rotational axis relative to one another.

12. The rotor system of claim 10, wherein the first slot and the first rotational axis intersect at an acute angle; and
    the second slot and the second rotational axis intersect at a right angle.

13. The rotor system of claim 12, wherein the first connector and the rod are rotatable about the first rotational axis relative to one another;
    the second connector and the rod are rotatable about the second rotational axis relative to one another; and
    the central link and the rod are substantially parallel.

14. A rotorcraft rotor system, the rotor system comprising:
    a hub coupled to a driveshaft;
    a blade coupled to the hub;
    a swashplate positioned about the driveshaft;
    an adjustable length pitch link having central link, a top rod end attached to the blade and a bottom rod end attached to the swashplate with a radial angle between the top rod end and the bottom rod end; and
    a centering tool comprising:
    a first connector coupled to one of the bottom rod end and the top rod end;
    a second connector coupled to the other of the bottom rod end and the top rod end, the centering tool holding the top rod end and the bottom rod end at the radial angle;
    a rod having a longitudinal axis, a front face, a rear face, a first rod end and a second rod end;
    the first rod end having a first aperture with a first rotational axis;
    the second rod end having a second aperture with a second rotational axis parallel to the first rotational axis;
    the first connector coupled to the first rod end and having a first slot holding the bottom rod end; and
    the second connector coupled to the second rod end, the second connector having a second slot holding the top rod end.

15. The rotor system of claim 14, wherein the first connector and the rod are rotatable about the first rotational axis relative to one another; and
    the second connector and the rod are rotatable about the second rotational axis relative to one another.

16. The rotor system of claim 14, wherein the first slot and the first rotational axis intersect at an acute angle; and
    the second slot and the second rotational axis intersect at a right angle.

17. The rotor system of claim 16, wherein the first connector and the rod are rotatable about the first rotational axis relative to one another;
 the second connector and the rod are rotatable about the second rotational axis relative to one another; and
the central link and the rod are substantially parallel.

* * * * *